United States Patent
Kaufman

(10) Patent No.: US 9,680,892 B2
(45) Date of Patent: Jun. 13, 2017

(54) PROVIDING INTEGRATION OF MULTI-BIT-RATE MEDIA STREAMS

(75) Inventor: Matthew Kaufman, Bonny Doon, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1549 days.

(21) Appl. No.: 12/493,126

(22) Filed: Jun. 26, 2009

(65) Prior Publication Data

US 2013/0166765 A1 Jun. 27, 2013

(51) Int. Cl.
| | |
|---|---|
| *G06F 15/16* | (2006.01) |
| *H04L 29/06* | (2006.01) |
| *H04N 21/262* | (2011.01) |
| *H04N 21/462* | (2011.01) |
| *H04N 21/658* | (2011.01) |
| *H04N 21/845* | (2011.01) |
| *G06Q 30/02* | (2012.01) |
| *H04N 21/2343* | (2011.01) |
| *H04N 21/254* | (2011.01) |

(52) U.S. Cl.
CPC ........ *H04L 65/4084* (2013.01); *H04L 65/602* (2013.01); *H04L 65/607* (2013.01); *H04N 21/26258* (2013.01); *H04N 21/4622* (2013.01); *H04N 21/6581* (2013.01); *H04N 21/8456* (2013.01); *G06Q 30/0241* (2013.01); *H04N 21/23439* (2013.01); *H04N 21/254* (2013.01)

(58) Field of Classification Search
CPC . H04L 65/607; H04L 29/06027; H04L 65/60; H04L 65/608; G06F 17/30997
USPC .................................................. 709/231, 232
See application file for complete search history.

(56) References Cited

U.S. PATENT DOCUMENTS

| | | | |
|---|---|---|---|
| 5,751,968 A | 5/1998 | Cohen | |
| 6,144,382 A * | 11/2000 | Hill | ...................... G06F 3/04812 345/419 |
| 6,938,047 B2 | 8/2005 | Kryeziu | |
| 7,400,764 B2 | 7/2008 | Kryeziu | |
| 7,496,676 B2 | 2/2009 | Kryeziu | |
| 7,783,773 B2 | 8/2010 | Wu et al. | |
| 7,925,774 B2 | 4/2011 | Zhang et al. | |
| 8,108,893 B2 * | 1/2012 | Haberman et al. | ............. 725/34 |

(Continued)

FOREIGN PATENT DOCUMENTS

WO WO 2006/138432 12/2006

OTHER PUBLICATIONS

U.S. Appl. No. 12/201,952, filed Aug. 29, 2008, Kappor et al.

(Continued)

*Primary Examiner* — Oleg Survillo
(74) *Attorney, Agent, or Firm* — Wolfe-SBMC

(57) ABSTRACT

Methods, systems, and apparatus, including computer programs encoded on a computer storage medium, based on multi-bit-rate streaming for inserting secondary streaming media into primary streaming media are described. In some implementations, the secondary streaming media, also referred to as insertion-media, may be advertisements. In other implementations, the secondary streaming media may be breaking news, emergency notifications or public service announcements. The systems and methods disclosed in this specification enable seamless integration of insertion-media streams with a primary media stream for providing a viewer a high-quality online video experience.

20 Claims, 10 Drawing Sheets

(56) References Cited

U.S. PATENT DOCUMENTS

| | | | |
|---|---|---|---|
| 2002/0072967 A1* | 6/2002 | Jacobs | G06Q 10/107 705/14.66 |
| 2003/0061369 A1 | 3/2003 | Aksu et al. | |
| 2005/0102371 A1 | 5/2005 | Aksu | |
| 2005/0132334 A1* | 6/2005 | Busfield | 717/124 |
| 2007/0053658 A1* | 3/2007 | Murakami et al. | 386/95 |
| 2007/0130601 A1* | 6/2007 | Li | H04L 12/18 725/112 |
| 2007/0162611 A1 | 7/2007 | Yu et al. | |
| 2007/0249330 A1* | 10/2007 | Cortegiano | G06Q 30/0207 455/414.2 |
| 2008/0195743 A1* | 8/2008 | Brueck et al. | 709/231 |
| 2008/0270449 A1* | 10/2008 | Gossweiler | G06F 17/30817 |
| 2008/0276173 A1 | 11/2008 | Li et al. | |
| 2009/0055417 A1* | 2/2009 | Hannuksela | 707/100 |
| 2009/0063491 A1* | 3/2009 | Barclay | G06Q 30/02 |
| 2009/0113300 A1* | 4/2009 | Tuli | H04M 1/72522 715/716 |
| 2009/0125636 A1 | 5/2009 | Li et al. | |
| 2009/0282162 A1 | 11/2009 | Mehrotra et al. | |
| 2009/0300145 A1* | 12/2009 | Musayev et al. | 709/219 |
| 2009/0303339 A1* | 12/2009 | Kudo et al. | 348/222.1 |
| 2010/0082488 A1* | 4/2010 | Evans | G06F 21/10 705/59 |
| 2010/0106965 A1* | 4/2010 | Ross | H04L 9/3213 713/156 |
| 2010/0153395 A1* | 6/2010 | Hannuksela et al. | 707/737 |
| 2010/0161825 A1 | 6/2010 | Ronca et al. | |
| 2010/0280876 A1* | 11/2010 | Bowra | G06Q 30/0242 705/14.41 |
| 2010/0303447 A1* | 12/2010 | Niemeijer | G06Q 30/02 386/250 |
| 2011/0295686 A1* | 12/2011 | Martin-Cocher | G06Q 30/02 705/14.49 |

OTHER PUBLICATIONS

Bill Birney, "Intelligent Streaming," Microsoft Corporation, May 2003, retrieved from internet: http://www.microsoft.com/windows/windowsmedia/howto/articles/intstreaming.aspx?pf=true, 7 pages.

"Move Networks Solutions," Move Networks, Inc., retrieved from internet on Aug. 29, 2008: http://www.movenetworks.com/why-move/solutions, 4 pages.

"Move Media Player," Move Networks, Inc., retrieved from internet on Aug. 29, 2008: http://www.movenetworks.com/wp-content/uploads/move-media-player.pdf, 3 pages.

"Move Adaptive Stream," Move Networks, Inc., retrieved from internet on Aug. 29, 2008: http://www.movenetworks.com/wp-content/uploads/move-adaptive-stream.pdf, 4 pages.

"Our Clients," Move Networks, Inc., retrieved from internet on Aug. 29, 2008: http://www.movenetworks.com/why-move/our-clients, 3 pages.

Non-final Office Action in U.S. Appl. No. 12/493,121 mailed May 12, 2011, 14 pages.

Final Office Action; Nguyen, Dustin ; Oct. 27, 2011; U.S. Appl. No. 12/493,121; 17 pages.

Office Action; Nguyen, Dustin ; May 12, 2011; U.S. Appl. No. 12/493,121; 14 pages.

Fish & Richardson, Amendment in Reply to Action of Oct. 27, 2011, U.S. Appl. No. 12/493,121, filed Jan. 27, 2012, 14 pages.

Fish & Richardson, Amendment in Reply to Action dated May 12, 2011, U.S. Appl. No. 12/493,121, filed Aug. 9, 2011, 17 pages.

* cited by examiner

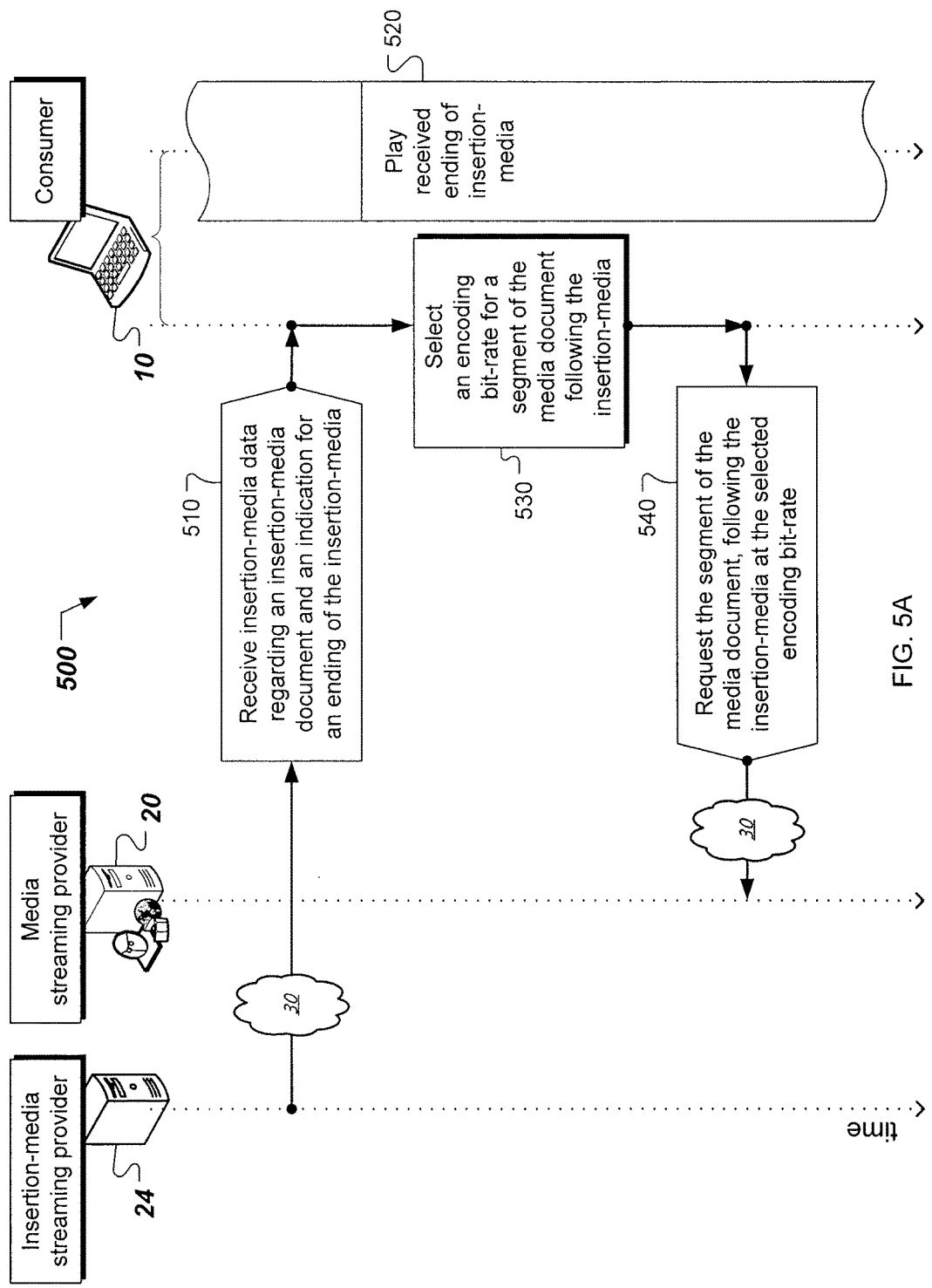

PROVIDING INTEGRATION OF MULTI-BIT-RATE MEDIA STREAMS

BACKGROUND

This specification relates to providing integration of multi-bit-rate media streams. Some multi-bit-rate Hypertext Transfer Protocol (HTTP) delivery systems can optimize a user's online viewing experience. Insertion of advertisements or emergency notifications into a primary media stream may serve commercial and safety interests, respectively. Public service announcements may also be inserted into the primary media stream.

The primary media may need to be stopped to insert such secondary streaming media into the primary media stream. The content of the secondary (or insertion) media may be played after stopping the primary media. At the end of the insertion-media stream, the primary media stream may be restarted. Further, the insertion-media and the primary media can be encoded at different bit-rates. For all the above reasons, a viewer using the foregoing insertion process may discern disconcerting transitions (stopping and starting) between sequential media streams.

SUMMARY

This specification describes technologies based on multi-bit-rate media streaming for inserting a secondary media stream into a primary media stream.

One aspect of the subject matter described in this specification can be implemented in a method that includes receiving, from a media streaming provider via a communication channel, data regarding a media document. The received data can contain an indication for upcoming insertion-media located at an insertion-media streaming provider different from the media streaming provider. While the received data is being output for playing on an output device, the method can include selecting an encoding bit-rate for the upcoming insertion-media based on the received data, and based on a supportable streaming bit-rate via the communication channel. The method can further include requesting the upcoming insertion-media at the selected encoding bit-rate from the insertion-media streaming provider. The upcoming insertion media may be an advertisement, breaking news, an emergency notification, or a public service announcement. Other implementations of this aspect include corresponding systems, apparatus, and computer programs, configured to perform the actions of the method, encoded on computer storage devices.

These and other implementations can include one or more of the following features. If an encoding bit-rate of the data being output for playing is less than the supportable streaming bit-rate via the communication channel then, selecting the encoding bit-rate for the upcoming insertion-media can include identifying the encoding bit-rate for the upcoming insertion-media to be larger than or equal to the encoding bit-rate of the data being output for playing, and smaller than the supportable streaming bit-rate via the communication channel. If the encoding bit-rate of the data being output for playing is larger than or equal to the supportable streaming bit-rate via the communication channel then, selecting the encoding bit-rate for the upcoming insertion-media can include identifying the encoding bit-rate for the upcoming insertion-media to be smaller than the supportable streaming bit-rate via the communication channel.

In some implementations, selecting the encoding bit-rate for the upcoming insertion-media can include identifying the encoding bit-rate for the upcoming insertion-media to be smaller than an encoding bit-rate of the data being output for playing on the output device. In other implementations, selecting the encoding bit-rate for the upcoming insertion-media can include identifying the encoding bit-rate for the upcoming insertion-media to be a largest encoding bit-rate for the upcoming insertion-media that is smaller than an encoding bit-rate of the data being output for playing on the output device. Further, selecting the encoding bit-rate for the upcoming insertion-media can include identifying the encoding bit-rate for the upcoming insertion-media to be a smallest encoding bit-rate of the upcoming insertion-media.

Furthermore, these and other implementations can include one or more of the following features. The received data can include a media data segment of the media document, and a portion of an index for the media document. The portion of the index for the media document can include information relating to fewer than all segments of the media document and the indication for the upcoming insertion-media. The method can further include receiving, from the insertion-media streaming provider, insertion-media data regarding an insertion-media document. The received insertion-media data can include an indication for an ending of the insertion-media. While the received insertion-media data is being output for playing on the output device, selecting an encoding bit-rate for a segment of the media document following the insertion-media. Also, while the received insertion-media data is being output for playing on the output device, requesting, from the streaming media provider, the segment of the media document following the insertion-media, at the selected encoding bit-rate.

In some implementations, if an encoding bit-rate of the insertion-media data being output for playing is less than the supportable streaming bit-rate via the communication channel then, selecting the encoding bit-rate for the segment of the media document following the insertion-media can include identifying the encoding bit-rate for the segment of the media document following the insertion-media to be larger than or equal to the encoding bit-rate of the insertion-media data being output for playing, and smaller than the supportable streaming bit-rate via the communication channel. In other implementations, if the encoding bit-rate of the insertion-media data being output for playing is larger than or equal to the supportable streaming bit-rate via the communication channel then, selecting the encoding bit-rate for the segment of the media document following the insertion-media can also include identifying the encoding bit-rate for the segment of the media document following the insertion-media to be smaller than the supportable streaming bit-rate via the communication channel.

In yet other implementations, selecting the encoding bit-rate of the segment of the media document following the insertion-media to be smaller than the encoding bit-rate of the insertion-media being output for playing on the output device, even if the encoding bit-rate of the insertion-media being output for playing on the output device is less than the supportable streaming bit-rate via the communication channel. The foregoing selection may occur if the processing capacity of the client processor becomes insufficient to decode media encoded at the bit-rate of the insertion-media being output for playing on the output device. In further implementations, selecting the encoding bit-rate for the segment of the media document following the insertion-media can include identifying the encoding bit-rate for the segment of the media document following the insertion-media to be an encoding bit-rate of the insertion-media data being output for playing on the output device.

According to another aspect, the described subject matter can also be implemented in a system including a user device and a set of computers communicatively coupled with the user device through a data communication network. The set of computers can include a server for providing media streaming, and another server for providing insertion-media streaming. The user device can be configured to receive, from the media streaming provider, data regarding a media document. The received data can include an indication for upcoming insertion-media located at the insertion-media streaming provider. While the received data is being output for playing on an output device, the user device can select an encoding bit-rate for the upcoming insertion-media based on the received data, and a supportable streaming bit-rate via the communication channel. The user device can be configured to also request the upcoming insertion-media at the selected encoding bit-rate from the insertion-media streaming provider.

These and other implementations can include one or more of the following features. The server for providing media streaming can include a storage device configured to store the media document and an index for the media document. The index for the media document is encoded within the media document. The index can include the indication for the upcoming insertion-media corresponding to a scheduled insertion-media switch point in media. The server for providing media streaming can include a processor communicatively coupled to the storage device. The processor can be configured to receive, from the user device, a request for at least a portion of the media included in the media document. The processor can be further configured to provide to the user device the requested portion of the media and the indication for the upcoming insertion-media.

In some implementations, the indication for the upcoming insertion-media can include a reference to a location of the upcoming insertion-media at the insertion-media streaming provider and available encoding bit-rates for the upcoming insertion-media. In other implementations, the indication for the upcoming insertion-media includes an indication for a conditional insertion. The indication for the conditional insertion can include a first reference to a location of the upcoming insertion-media at the insertion-media streaming provider and available encoding bit-rates for the upcoming insertion-media. The first reference can be used when a predetermined condition is met. The indication for the conditional insertion can include a return reference to the data being output for playing on the output device of the user device. The return reference can be used when the predetermined condition is not met, and after the completion of the insertion-media. Further, the index for the media document can include multiple indications for insertion-media relating respectively to corresponding insertion-media scheduled for sequential play during a scheduled insertion-media switch points in the media.

These and other implementations can include one or more of the following features. The server for providing insertion-media streaming can include a storage device configured to store segments of an insertion-media document. Each segment of the insertion-media document can include an insertion-media portion encoded at one of multiple different bit-rates. Each segment of the insertion-media document can also include a portion of an index for the insertion-media document. The portion of the index for the insertion-media document can include information relating to segments of the insertion-media document that include a following insertion-media portion encoded at the multiple bit-rates, respectively. The server for providing insertion-media streaming can include a processor communicatively coupled to the storage device. The processor can be configured to receive, from the user device, a request for at least a segment of the insertion-media document. The processor can be further configured to provide to the user device the requested segment of the insertion-media document. In some implementations, the following insertion-media portion can include a beginning of another insertion-media included in the insertion-media document. In other implementations, each of the segments of the insertion-media document that includes the following insertion-media portion can include an ending of the insertion-media included in the insertion-media document. Each of the segments of the insertion-media document that includes the following insertion-media portion can also include a portion of the index for the insertion-media document including instructions for the user device to request media from the media streaming provider. The request from the media streaming provider may be based on information found in the portions of the index for the media document received by the user device.

These and other implementations can include one or more of the following features. The server for providing media streaming can include a storage device configured to store the data regarding the media document. The stored data can include the media document and an index for the media document. The index for the media document is encoded separately from the media document. The index for the media document can include references to byte-offsets of the media document. The byte-offsets corresponding to portions of media included in the media document. The index for the media document can also include indications for multiple insertion-media corresponding respectively to scheduled insertion-media switch points in media. The indications for multiple insertion-media can include the indication for the upcoming insertion-media. The server for providing media streaming can also include a processor communicatively coupled to the storage device. The processor can be configured to receive, from the user device, a request for at least a portion of the media included in the media document. The processor can be further configured to provide to the user device the indication for the upcoming insertion-media if the requested portion of the media corresponds to an upcoming insertion-media switch point.

These and other implementations can include one or more of the following features. The server for providing media streaming can include a storage device configured to store the media document. The media document can include media files corresponding to portions of media included in the media document. The files can include indications for insertion-media corresponding respectively to scheduled insertion-media switch points in media. The indications for insertion-media can include the indication for the upcoming insertion-media. The server for providing media streaming can further include a processor communicatively coupled to the storage device. The processor can be configured receive, from the user device, a request for at least a portion of the media included in the media document. The processor can be further configured to provide to the user device the requested portion of the media and the indication for the upcoming insertion-media.

Particular embodiments of the subject matter described in this specification can be implemented so as to realize one or more of the following potential advantages.

The techniques and systems disclosed in this specification can seamlessly integrate advertisement streaming into a multi-bit-rate online video. Further, the techniques disclosed here neither have to stop a primary media stream to insert a secondary media stream for advertising or for emergency notifications, nor have to restart the primary media stream when the advertisement or the emergency notification ends. Furthermore, by avoiding such media breaks, the techniques described in this specification may avoid re-buffering before and after the advertisement plays.

These techniques may also reduce the difference in viewing quality between the advertisement video and the primary video. For example, when both the primary video and the inserted advertisement video may be available as multi-bit-rate streams, the client may adaptively select an encoding bit-rate for the advertisement video that matches (or is close to) an encoding bit-rate for the primary video, to potentially provide a viewer similar quality online-video experiences for the inserted advertisement video and the primary video.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 5A shows an example technique for providing a segment of a media document upon ending of an insertion-media.

Like reference numbers and designations in the various drawings indicate like elements.

DETAILED DESCRIPTION

This specification describes systems and methods based on multi-bit-rate streaming for inserting secondary streaming media into primary streaming media. In some implementations, the secondary streaming media, also referred to as insertion-media, may be advertisements. In other implementations, the secondary streaming media may be breaking news, emergency notifications or public service announcement. The systems and methods disclosed in this specification enable seamless integration of insertion-media streams with a primary media stream for providing a viewer a high-quality online video experience.

The techniques and systems disclosed in this specification can be combined with an HTTP implementation of the ADOBE® FLASH® Media Server (available from Adobe Systems Incorporated, of San Jose, Calif.) for multi-bit-rate delivery of streaming video.

Figure 1:
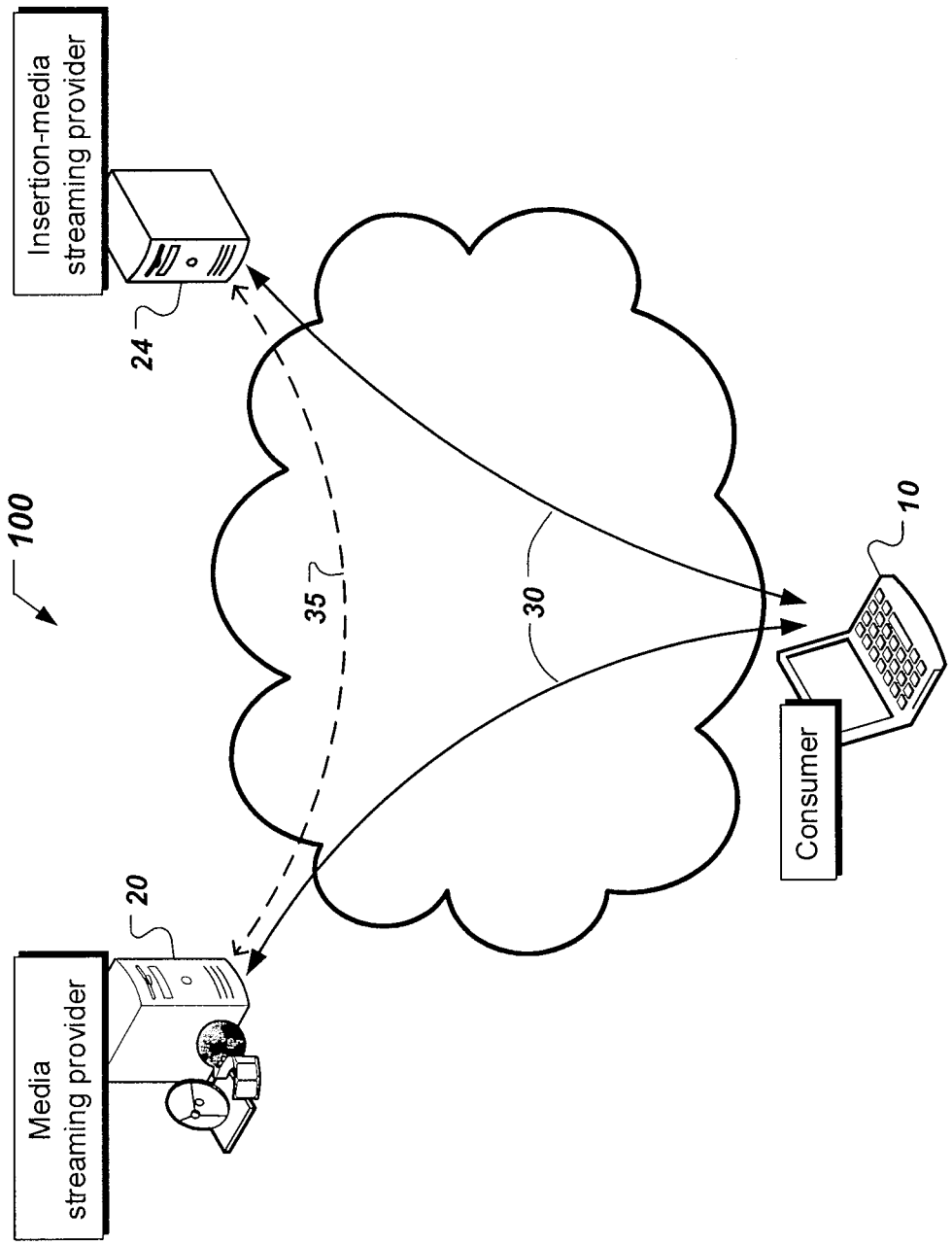
FIG. 1 shows a block diagram of an example system for providing integration of multi-bit-rate media streams.

FIG. 1 shows a block diagram of an example system for providing integration of multi-bit-rate media streams. A communication system 100 includes a consumer 10 communicatively coupled to a media streaming provider 20 via a communication channel 30. The media streaming provider 20 may provide a primary stream of media to the consumer 10. In some implementations, the communication channel 30 can be implemented via the internet. In other implementations, the communication channel 30 can be implemented via a private communication network. The communication protocol over the communication channel 30 can be Transmission Control Protocol (TCP).

Further, the consumer 10 can be communicatively coupled to an insertion-media streaming provider 24 via the communication channel 30. The insertion-media streaming provider 24 may provide a secondary stream of media to the consumer 10. The secondary stream of media may be of shorter duration than the primary stream of media. Furthermore, the secondary stream of media may be an advertisement, a public service announcement, an emergency notification, breaking news, etc.

The media streaming provider 20 can be communicatively coupled to the insertion-media streaming provider 24 via a communication channel 35. In some implementations, the communication channel 35 may be the same as or similar to the communication channel 30. In other implementations, the communication channel 35 may be available intermittently.

The consumer 10 can be identified as a client 10 and necessarily includes some hardware since the consumer 10 includes a computerized electronic device 10. The computerized electronic device 10 may be a laptop computer, a media player device, a mobile device, etc. The computerized electronic device 10 includes a processor and may also include a storage device. The processor may be configured to request and receive a media stream from the media streaming provider 20. The processor may be further configured to request and receive an insertion-media stream from the insertion-media streaming provider 24. Furthermore, the computerized electronic device 10 includes an output device for playing the received media and insertion-media.

The media streaming provider 20 can be identified as a media streaming server and necessarily includes some hardware since the media streaming provider 20 may contain multiple processors included, e.g., in a blade-server system. The insertion-media streaming provider 24 can also be identified as a media streaming server and necessarily includes some hardware since the insertion-media streaming provider 24 may also include at least a computer workstation. The components of the media streaming server are described in detail with reference to FIG. 3A.

A media streaming server may represent an unmodified HTTP server. The consumer 10 may use an HTTP-byte-range request to retrieve segments of a media document that can be stored on the HTTP media streaming server of the media streaming provider 20. Further, the consumer 10 may use an HTTP-byte-range request to retrieve segments of an insertion-media document that can be stored on the HTTP media streaming server of the insertion-media streaming provider 24. Either the media document or the insertion-media document can be identified as an electronic document which may, but need not correspond to a file. An electronic document may be stored in a portion of a file that holds other documents, in a single file dedicated to the document in question, or in multiple coordinated files.

In some implementations, as data regarding the media document or the insertion-media document is being played by the consumer 10, a client processor can calculate whether an increase or a decrease in bit-rate may be warranted, and can select which media segments or insertion-media segments are to be fetched next. In order to accurately request the selected media segments or the selected insertion-media segments from an unmodified HTTP media streaming server at the media streaming provider 20 or at the insertion-media streaming provider 24, respectively, the client 10 can use index information to translate from the selected segment number (equivalent to time offset) and the selected encoding bit-rate to a start and end byte offset (and, in the case of multiple files, the name of the file containing that segment). The media document and its associated index are described in detail with reference to FIG. 3B. The insertion-media document and its associated index are described in detail with reference to FIG. 3C.

Figure 2:
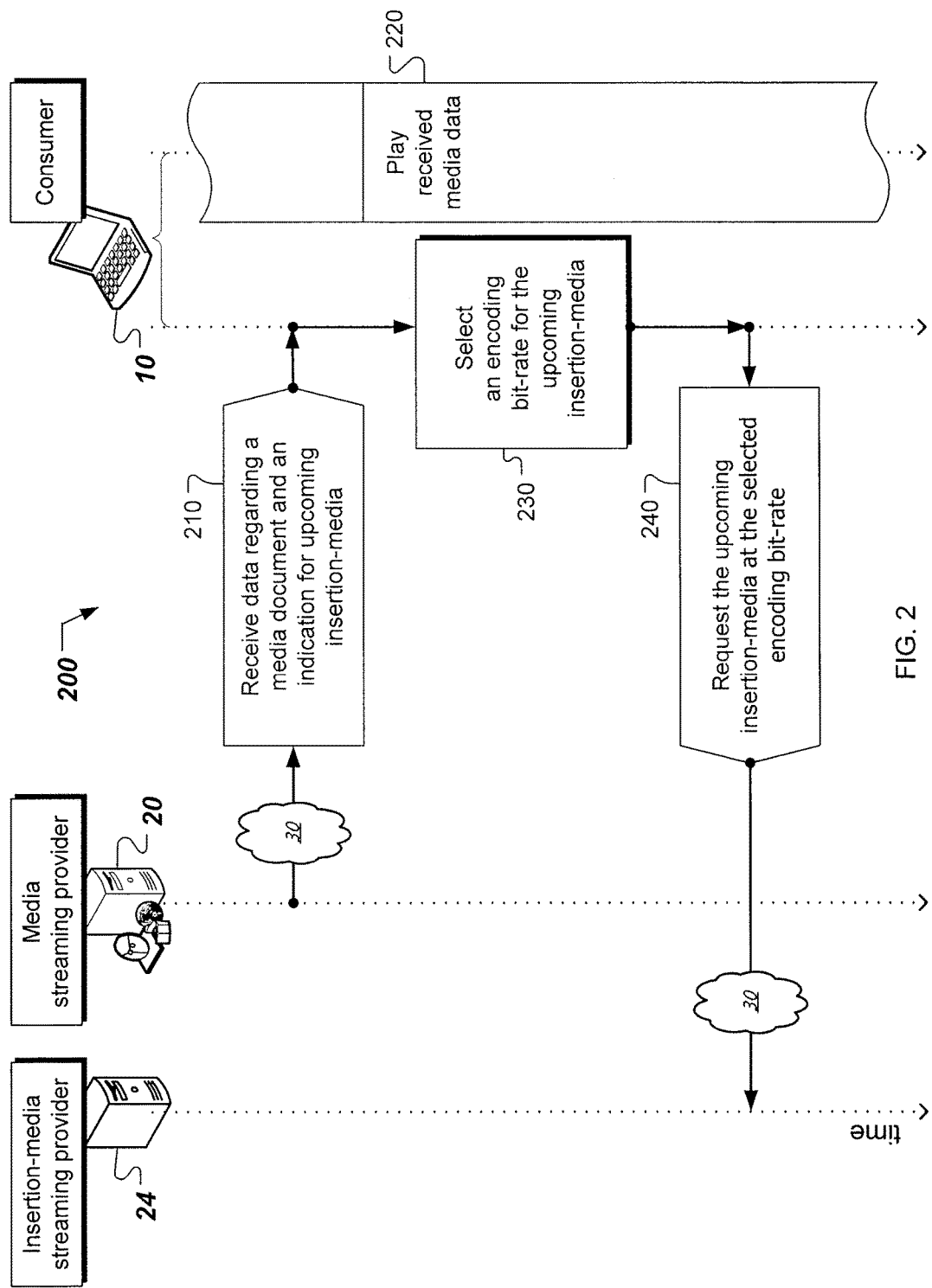
FIG. 2 shows an example technique for providing integration of multi-bit-rate media streams.

An example of a technique 200 for providing an insertion-media stream to HTTP-based adaptive-bit-rate media streaming is now described in connection with FIG. 2. The technique can receive 210 data regarding a media document from the media streaming provider 20 via the communication channel 30. The received data regarding a media document can include an indication for upcoming insertion-media located at an insertion-media streaming provider 24 different from the media streaming provider 20.

While the received data is being output for playing 220 on an output device at the consumer 10, the technique can select 230 an encoding bit-rate for the upcoming insertion-media based on information included in the indication for the upcoming insertion-media. For example, the indication for the upcoming insertion-media may contain information relating to available encoding bit-rates for the upcoming insertion-media located at the insertion-media streaming provider 24. Further, the selection 230 may be based on a combination of information included in the indication for the upcoming insertion-media and a supportable streaming bit-rate via the communication channel 30. For example, upon receiving 210 the data regarding the media document, the processor at the client 10 can infer (from TCP information) an instant streaming bit-rate supportable via the communication channel 30. The streaming bit-rate supportable via the communication channel 30, as experienced by the client 10, may vary in time, and may depend on the client's 10 network activity, and on the overall network 30 activity. Once the processor at the client 10 infers the instant streaming bit-rate supportable via the communication channel 30, the selection 230 can proceed to identify an encoding bit-rate for the upcoming insertion-media that can provide uninterrupted transmission and high resolution playing. An example implementation of the selection 230 is described in detail with reference to FIG. 4.

The technique can then request 240 the upcoming insertion-media at the selected encoding bit-rate from the insertion-media streaming provider 24. In some implementations, requesting 240 the upcoming insertion-media at the selected encoding bit-rate via a communication channel 30 based on HTTP can include specifying a name of the insertion-media document, a byte-offset to indicate the beginning of the selected insertion-media, and a byte-range to indicate the size of a segment of the insertion-media document.

Figure 3A:
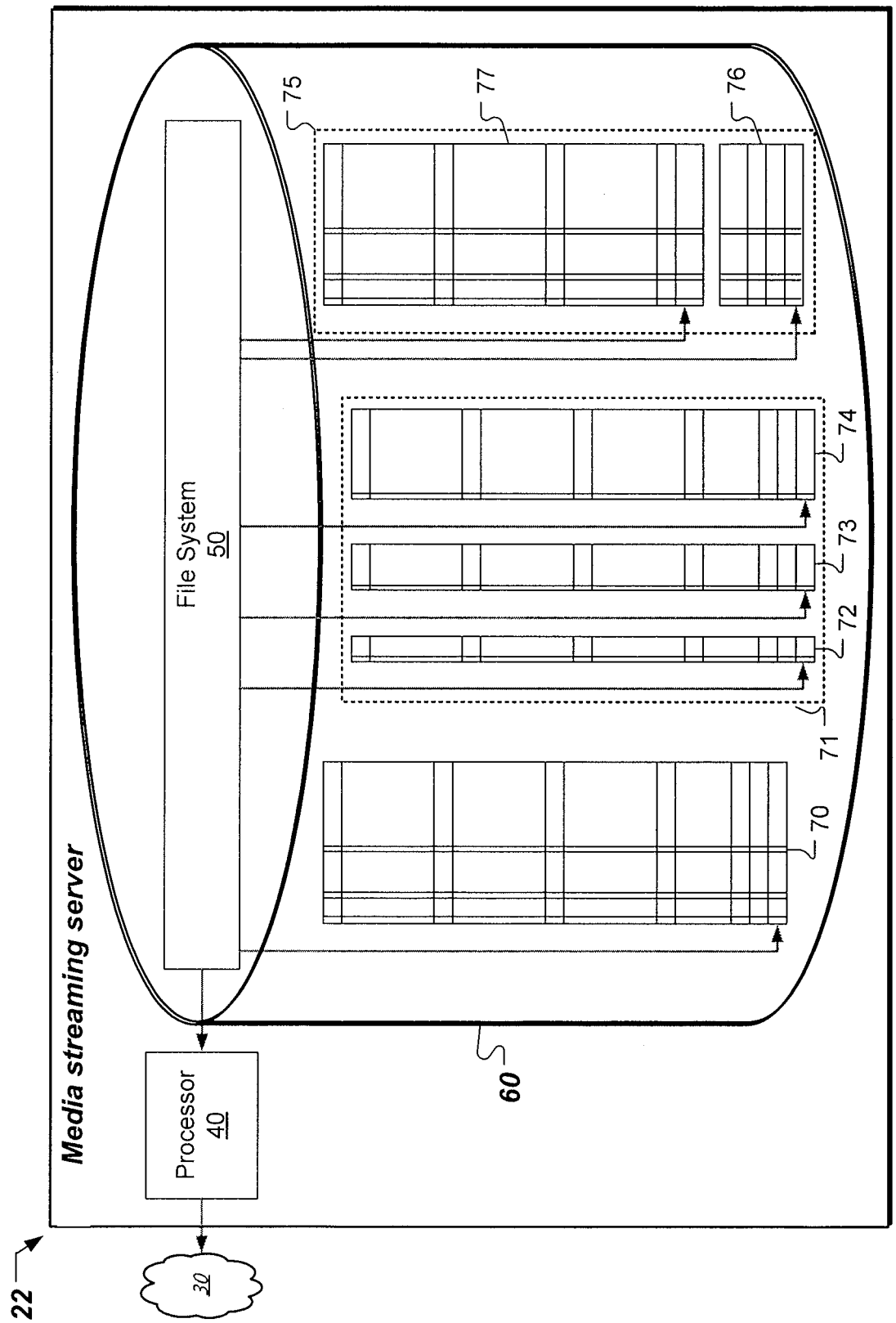
FIG. 3A shows a block diagram of an example media streaming server for multi-bit-rate streaming delivery.

FIG. 3A shows a block diagram of an example media streaming server 22 for multi-bit-rate streaming delivery. The example media streaming server 22 can be implemented for multi-bit-rate streaming delivery at the media streaming provider 20. Further, the example media streaming server 22 can be implemented for multi-bit-rate streaming delivery at the insertion-media streaming provider 24.

A media streaming server 22 can be communicatively coupled with a remote media play point via a communication channel 30. In some implementations, the remote media play point may be the consumer 10. The media streaming server 22 includes a processor 40 communicatively coupled to a store 60. The store 60 may be a storage device, for example a hard drive or a flash card. The store can be further identified as a database 60 integrated into a file system 50. The database 60 can be configured to store electronic documents 70, 71 and 75. Each of the electronic documents 70, 71 and 75 may further include segments of the respective electronic document. If the example media streaming server 22 is being implemented at the media streaming provider 20, then the electronic documents 70, 71 and 75 can be identified as media documents 70, 71 and 75. If the example media streaming server 22 is being implemented at the insertion-media streaming provider 24, then the electronic documents can be identified as insertion-media documents 70', 71' and 75'. (Note that throughout this specification, primed-references are associated with insertion-media documents.)

In some implementations, each segment of a media document may include a media portion of the respective media document. In this specification, the media portion is also referred to interchangeably as the media data segment, or the media segment. The media portion can be encoded at a bit-rate selected from multiple possible bit-rates. Furthermore, each segment of the media document may include a portion of an index for the media document. The index portion contains information relating to fewer than all segments of the media document. The information contained in the index portion includes byte-offsets corresponding to the fewer than all segments of the media document.

Further, the information contained in the index portion includes an indication for an upcoming insertion-media. The upcoming insertion-media can be inserted at an insertion-media switch point in the media. For example, the insertion-media may be a local news-update inserted during a scheduled local-news spot. In another example, the insertion-media may be an advertisement inserted during a scheduled commercial-break.

In some implementations, the media document 70 can be encoded into a single file. In such implementations, segments of the media document that include media portions encoded at each of the multiple bit-rates, respectively, may be interleaved in the single file.

In other implementations, the media document 71 can contain a small number of files, 72-74, and each file may correspond to a (different) encoding bit-rate. For example, a recorded one-hour show can be encoded at a low bit-rate in file 72, at an intermediate bit-rate in file 73, at a high bit-rate in file 74.

In yet other implementations, the media document 75 can contain a small number of files, 76 and 77. For example, a first file 76 may correspond to the initial 6 minutes of a recorded one-hour show, while the second file 77 may correspond to the remaining 54 minutes of the recorded one-hour show. Further, each media portion of files 76 and 77 can be encoded at each of the multiple bit-rates.

Each file 70, 72-74, 76 and 77 can include audio, video, and index information. Detailed descriptions of a media document 70 and an insertion-media document 70' are presented with reference to FIGS. 3B and 3C, respectively.

The processor 40 of the media streaming server 22 can be configured to receive, from the remote media play point, a request for a portion of the media included in the media document (e.g., 70) or a request for a portion of the insertion-media included in the insertion-media document (e.g., 70'). The request can include the name of the respective electronic document, a byte-offset to indicate the beginning of the requested portion, and a byte-range to indicate the size of the requested portion. The characteristics of the foregoing request may describe an HTTP request. Further, the processor 40 may be configured to provide to the remote media play point the requested segment of the media document 70 and the indication for upcoming insertion-media.

Figure 3B:
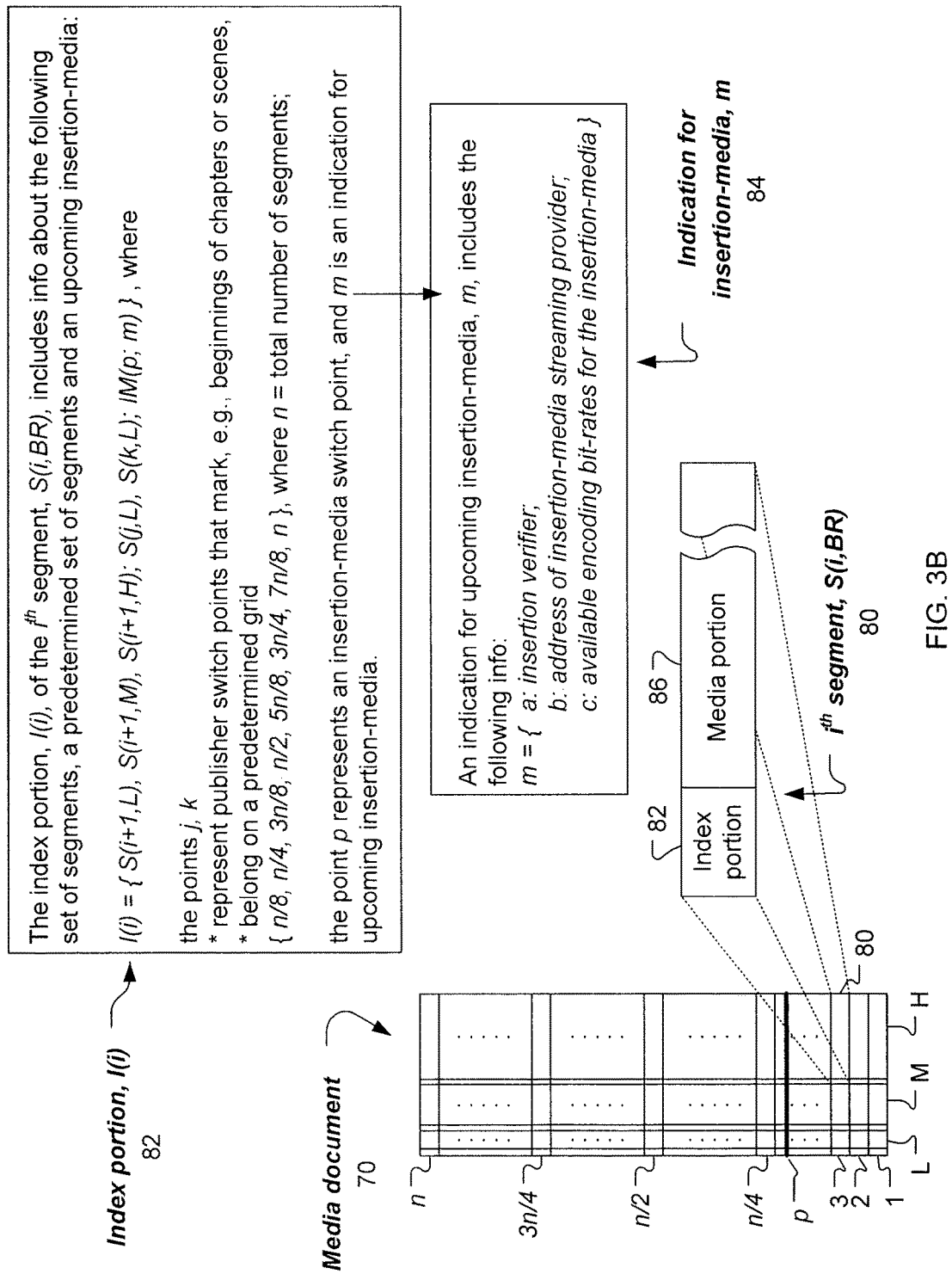
FIG. 3B shows a schematic of an example media document including an index interleaved in the media document.

FIG. 3B shows a schematic of an example media document 70 including an index interleaved in the media document 70. In such implementations, an index for the media document 70 may be arranged in a prioritized (partially hierarchical) order, and may be distributed throughout the media document 70 based on that order, as described below. The media document 70 can include segments of the media document, S(i, BR) 80. Each segment of the media document, S(i, BR) 80, includes an index portion, I(i) 82, and a media portion, MP(i, BR) 86. The segment number "i" may be associated to a time offset for the media portion, MP(i, BR) 86, included in the segment of the media document, S(i, BR) 80. For example, there may be n time offsets in media included in the media document 70.

The index portion 82 can include (i) a predetermined byte-offset and (ii) a predetermined byte-range within each segment of the media document. A media document 70 can have an index that may be placed in fixed-size index portions 82 of segments of the media document 80. The fixed-size index portions 82 can be reserved and padded to fit information relating to fewer than all segments of the media document. Further, the index portion 82 can be placed at either the beginning or the end of a segment of the media document 80. For example, the MP4 file format satisfies the foregoing properties. The foregoing format of a media document 70 may allow for the index information to be written late for near-live encoding.

The encoding bit-rate, BR, of a media portion 86 can be one of the multiple encoding bit-rates described above. For example, each media portion 86 may be encoded at a low (L) bit-rate, a medium (M) bit-rate and a high (H) bit-rate. An example of a low bit-rate for video encoding is 100 kbps. An example of a medium bit-rate for video encoding is 250 kbps. Examples of high bit-rates for video encoding are 1 Mbps and 3 Mbps.

The index portion, I(i) 82, included in a segment of the media document, S(i, BR) 80, may include information about a first set of segments, fewer than all segments of the media document 70. The segments in the first set of segments include, respectively, media portions succeeding the media portion, MP(i, BR) 86, each succeeding media portion encoded at each of the multiple bit-rates. In the implementation illustrated in FIG. 3B, the index portion, I(i) 82, corresponding to the segment of the media document, S(i, BR) 80, includes information about segments that include the immediately following (consecutive) media portion, MP(j=i+1, BR), encoded at all three available bit-rates, L, M and H: S(i+1, L), S(i+1, M) and S(i+1, H).

In some implementations, information about the first set of segments may provide the ability for the client 10 to switch bit-rates. As disclosed above, the received index portion, I(i) 82, (received along with the received media portion, MP(i, BR) 86) may allow the client 10 to select any encoding bit-rate of the following media segment, S(i+1, BR). In other implementations, in order to pipeline the delivery, the index portion 82 may also include the information for the client 10 to select any bit-rate of a few additional segments forward. For instance, the received index portion, I(i) 82, may also include information about the second next S(i+2, BR), third next S(i+3, BR) and fourth next S(i+4, BR) segments.

However, information about segments from the first set of segments may be insufficient for random-access seeking. Thus, the index portion, I(i) 82, included in the segment of the media document, S(i, BR) 80, may also include information about a second set of segments, fewer than all segments of the media document. Segments from the second set of segments may be associated, respectively, with predetermined media locations (points or time offsets) of the media document 70. In some implementations, each segment from the second set of segments includes a media portion 86 encoded at the lowest bit-rate from the multiple bit-rates.

In the example illustrated in FIG. 3B, the index portion, I(i) 82, corresponding to the segment of the media document, S(i, BR) 80, includes information about the segment of the media document at point-j, S(j, L), and about the segment of the media document at point-k, S(k, L). Further in this example, the media locations "j" and "k" may belong on a predetermined "grid" of equally spaced time divisions: {n/8, n/4, 3n/8, n/2, 5n/8, 3n/4, 7n/8, n}, where n is the total number of segments of the media document. Note that in this example, the information included in the index portion 82 may be limited to segments from the second set of segments having media portions encoded at the lowest available encoding bit-rate. Random-access seek information in the hierarchical index provided only for the baseline bit-rate may be adequate because playback is interrupted when randomly seeking. Thus, a client 10 may experience playback of the same quality at the seek-to point as playback during the first segment of the media document, S(1, L). Further, once playback may resume at that seek-to point, the client 10 can receive information to fetch the NEXT segment 80 (just a few seconds later) at a higher bit-rate, if the supportable streaming bit-rate via the communication channel 30 is higher than the available encoding bit-rates.

In other implementations, the predetermined media locations include byte-offsets that can be spaced to divide the media in the media document 70 into portions having gradually shorter duration. In such implementations, the byte-offsets included in an index portion, I(1), associated with the first segment of the media document, S(1, L), can have the longest spacing. For example, the index portion I(1) corresponding to the first segment of the media document S(1, L) may include information about the segment of the media document at the halfway point-n/2, S(n/2, L), and about the last segment of the media document, n, S(n, L). Then, the index portion, I(2), corresponding to the second segment of the media document, S(2, BR), may include information about the segment of the media document at the quarter-way point-n/4, S(n/4, L), and about the segment of the media document at the three-quarter-way point-3n/4, S(3n/4, L). The spacing of the predetermined points may be reduced incrementally in subsequent segments before reaching a shortest spacing equal to the duration of the media portion 86 included in each segment 80.

Each segment of the media document 80 may include an index portion 82 to provide information for progressive (forward) media playing. The index portion 82 can also be used in the case where the received segment may be the target of a random-access seek. Therefore, the index portion 82 of a received segment 80 may also include finely-grained index information for the region of the media in the vicinity of the received segment of the media document 80. Thus, the client 10 can accumulate enough information in an in-memory index (cumulative index maintained by the client 10) to seek randomly to other segments of the media document. Thus, in case a user seeks to a later point of the media document 70, the user may be able to resume playback at a point roughly equivalent to a requested (seek-to) position. However, as more segments may be received, the cumulative index, maintained by the client 10, can become more and more accurate.

Frame-accurate seeking within a segment of the media document 80 can be performed independently of index information, because byte-locations within the frame can be calculated by examining the individual frame data blocks once the segment 80 is received.

In yet other implementations, additional hierarchical index information regarding the second set of segments may be provided for evenly-spaced future points in time for which space in the first index portion, I(1), may be available, (e.g., the halfway-point, the quarter and three-quarter points, the "⅛th", "⅜ths", "⅝ths", and "⅞ths" points and so on,) until space in the first index portion, I(1), may be exhausted.

The second set of segments may also be associated with publisher switch points. In some implementations relating to pre-recorded content, the publisher switch points may be chapter points or scene points. Information about the segments of the media document associated with the publisher switch points may also be included in the index portion, I(1), of the first segment of the media document, S(1,L), until space in the first index portion, I(1), is exhausted. In the foregoing examples, a segment of the media document identified in the first or second set of segments may include media that succeeds the received media data segment, MS(i, BR) 86.

However, a segment identified in the second set of segments may also include media that precedes the received media data segment, MS(i, BR) 86. Because the user may seek to any point at any time, some of the index data in later segments of the media document 80 may replicate the finer-grained detail in the earlier segments (second segment, S(2, BR), third segment, S(3, BR), and so on) so that the in-memory index, maintained by the client 10, may be filled out even if the user immediately seeks to a late point in the media. Further, if the user seeks in such a way that prior index portions 82 become necessary in order to improve seek resolution, the client 10 may choose to download (but not play) these earlier segments 80. In doing so, the client 10 can receive the index portions 82 for the earlier segments 80 and can fill out the in-memory index. Downloading earlier segments 80 may briefly use additional bandwidth and potentially interrupt play. However, when the user is randomly seeking to new points, playback may already have been interrupted.

The second set of segments can also be associated with upcoming insertion-media. Information about the upcoming insertion-media, IM(p, m), includes an indication for an upcoming insertion-media, m 84, and an insertion-media switch point identified by a byte-location "p".

In some implementations, the insertion-media switch points can correspond to ad-breaks, and the client 10 may request an advertisement from an advertisement provider. In other implementations, the insertion-media switch points can correspond to conditional message insertion points. At the conditional message insertion points the client 10 may request other types of messages, such as conditional ads, breaking news or emergency notifications, from a central service.

The indication for the upcoming insertion-media, m 84, includes an insertion verifier, "a". In some implementations, the insertion verifier, "a", can be a Boolean flag preset to TRUE. In this case, insertion-media can be requested from the insertion-media streaming provider 24. In other implementations, the insertion verifier, "a", can include instructions to verify whether or not a predetermined condition is met, and to request the insertion-media from the insertion-media streaming provider 24 when the predetermined condition is met. The insertion verifier, "a", can also include a return reference. The return reference can include instructions for returning to the primary data being output for playing on the output device of the user device 10. The return reference may be used when the predetermined condition is not met. The return reference may also be used after the completion of the insertion-media.

The indication for the upcoming insertion-media, m 84, can also include a reference to a location of the upcoming insertion-media, "b", at the insertion-media streaming provider 24. In some implementations, the reference, "b", can include an address of the insertion-media streaming provider 24 and a path to an insertion-media document 70', including a byte location for the beginning of the upcoming insertion-media within the insertion-media document 70'. In other implementations, the reference, "b", can be to a redirection service that may provide insertion-media on a rotating basis. In such implementations, the insertion-media may represent advertisements targeted to a specific viewer. The return reference described above in regard to the insertion verifier, a, may be used to return from the insertion-media, provided by the redirection service, to the primary data being output for playing on the output device of the user device 10 upon completion of the insertion-media provided by the redirection service.

The indication for the upcoming insertion-media, m 84, can also include available encoding bit-rates for the upcoming insertion-media, "c".

The index for the media document 70 can include multiple indications for insertion-media relating, respectively, to corresponding insertion-media scheduled for play at insertion-media switch points "p", "q", . . . . The insertion-media switch points "p", "q", . . . may be scheduled sequentially. The original content publisher (e.g., the operator of the media streaming provider 20) may use an index for the media document 70 that includes multiple indications for ads to chain together multiple advertisements.

Figure 3C:
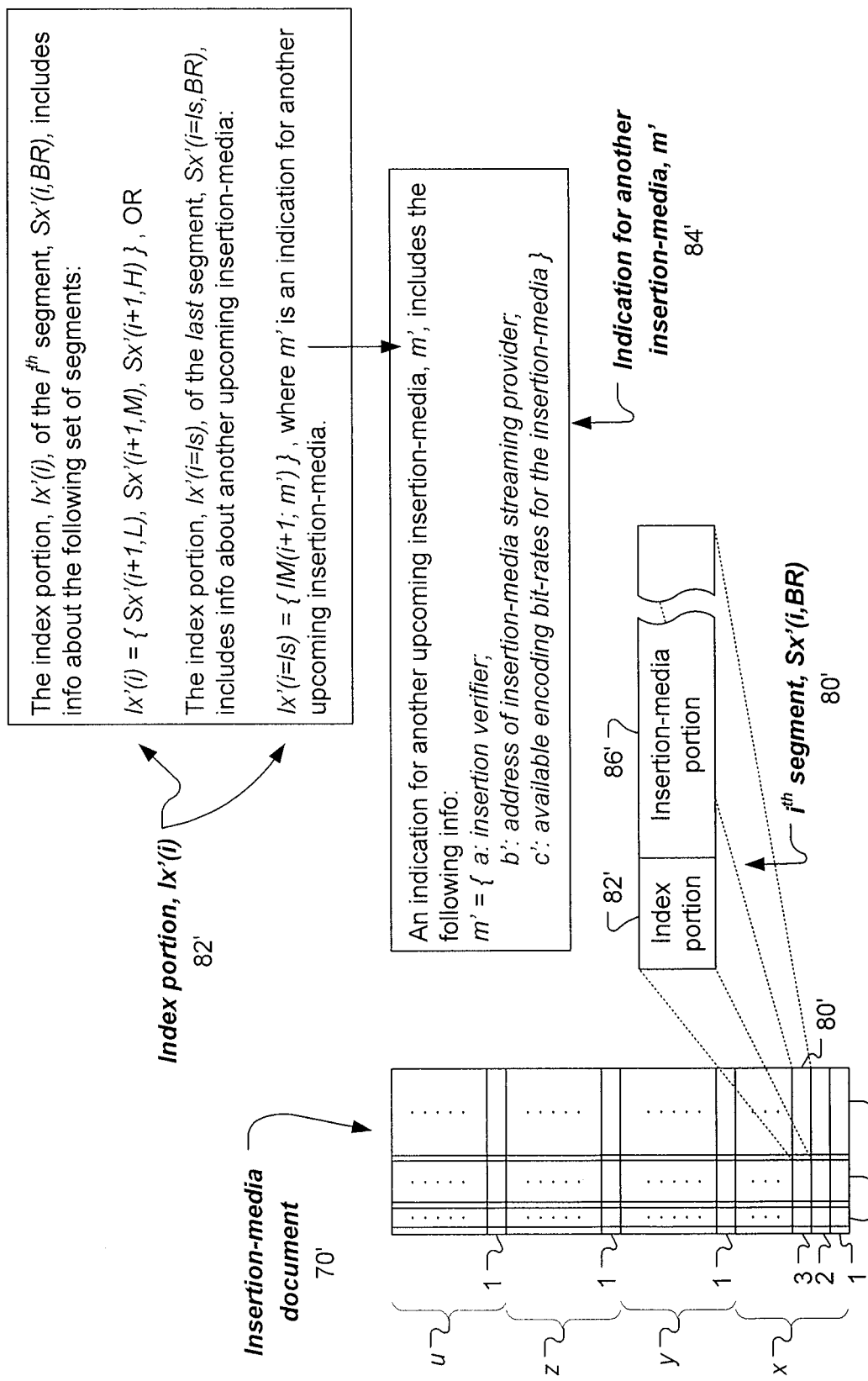
FIG. 3C shows a schematic of an example insertion-media document including an index interleaved in the insertion-media document.

FIG. 3C shows a schematic of an example insertion-media document 70' including an index interleaved in the insertion-media document 70'. In such implementations, an index for the insertion-media document 70' can be distributed throughout the insertion-media document 70' as described below.

The insertion-media document 70' can include multiple insertion-media labeled x, y, z and u. Further, the insertion-media document 70' can include segments of the insertion-media document, Sx(i, BR) 80'. Note that for segments of the insertion-media document 80', a subscript identifies the respective insertion-media. For example, the segments Sx(1, BR), Sx(2, BR), Sx(3, BR), . . . , correspond to insertion-media x; the segment Sy(1, BR) is the first segment of insertion-media y; and so on.

Each segment of the insertion-media document, Sx(i, BR) 80', includes an index portion, Ix(i) 82', and a media portion, MPx(i, BR) 86'. As described above, the subscript x identifies the insertion-media x. The segment number "i" may be associated with a time offset for the insertion-media portion, MPx(i, BR) 86', included in the segment of the media document Sx(i, BR) 80'.

The encoding bit-rate, BR, of an insertion-media portion 86' can be one of the multiple encoding bit-rates described above, e.g., low (L) bit-rate, medium (M) bit-rate and high (H) bit-rate. The index portion, Ix(i) 82', included in a segment of the insertion-media document, Sx(i, BR) 80', can include information about segments including, respectively, media portions succeeding the media portion MPx(i, BR) 86', each succeeding media portion encoded at each of the multiple bit-rates, respectively. In the implementation illustrated in FIG. 3C, the index portion Ix(i) 82' corresponding to the segment of the insertion-media document Sx(i, BR) 80' includes information about segments that include the immediately following (consecutive) insertion-media portion, MPx(j=i+1, BR), encoded at all three available bit-rates L, M and H: Sx(i+1, L), Sx(i+1, M) and Sx(i+1, H).

However, the index portion Ix(i=ls) corresponding to the last ("ls") insertion-media portion MPx(i=ls, BR) of insertion-media x, includes information about another insertion-media IM(i+1, m'). The information about the other insertion-media IM(i+1, m') contains an indication for the other upcoming insertion-media m' 84'. The corresponding insertion-media switch point is identified by the byte-location "ls+1", and corresponds to the beginning of another insertion-media.

The indication for the other upcoming insertion-media, m' 84', includes an insertion verifier, a. In some implementations, the insertion verifier can be a Boolean flag preset to TRUE. In this case, the other insertion-media can be requested from the insertion-media streaming provider 24 or from another insertion-media streaming provider. In other implementations, the insertion verifier, a, can include instructions to verify whether a predetermined condition is met or not, and to request the other insertion-media from the insertion-media streaming provider 24 or from another insertion-media streaming provider when the predetermined condition is met. The insertion verifier, a, can also include a return reference. The return reference can include instructions for returning to the primary data output for playing on the output device of the user device 10 prior to playing the insertion-media x. The return reference may be used when the predetermined condition is not met. The return reference may be used after the completion of the other insertion-media. The indication for the other upcoming insertion-media, m' 84', can also include a reference to a location of the other upcoming insertion-media, b', at the other insertion-media streaming provider. In other implementations, the reference, b', can refer to a redirection service that may provide the other insertion-media on a rotating basis. The indication for the other upcoming insertion-media, m' 84', can also include available encoding bit-rates for the other upcoming insertion-media, c'.

In some implementations, an index for the insertion-media document 70' that can be distributed throughout the insertion-media document 70', as described above, may be used by an advertiser to chain together multiple advertisements.

As addressed above in connection with FIGS. 3A-3B, the indication about the upcoming insertion-media included in the index portion, I(i) 82, of the received segment of the media document, S(i, BR) 80, can contain the encoding bit-rates available for the upcoming insertion-media. As indicated in connection with FIG. 2, the information about the encoding bit-rates available for the upcoming insertion-media in combination with the streaming bit-rate supportable via the communication channel 30—inferred while receiving 210 the data regarding the media document—can be used to select 230 the encoding bit-rate of the upcoming insertion-media.

Figure 4:
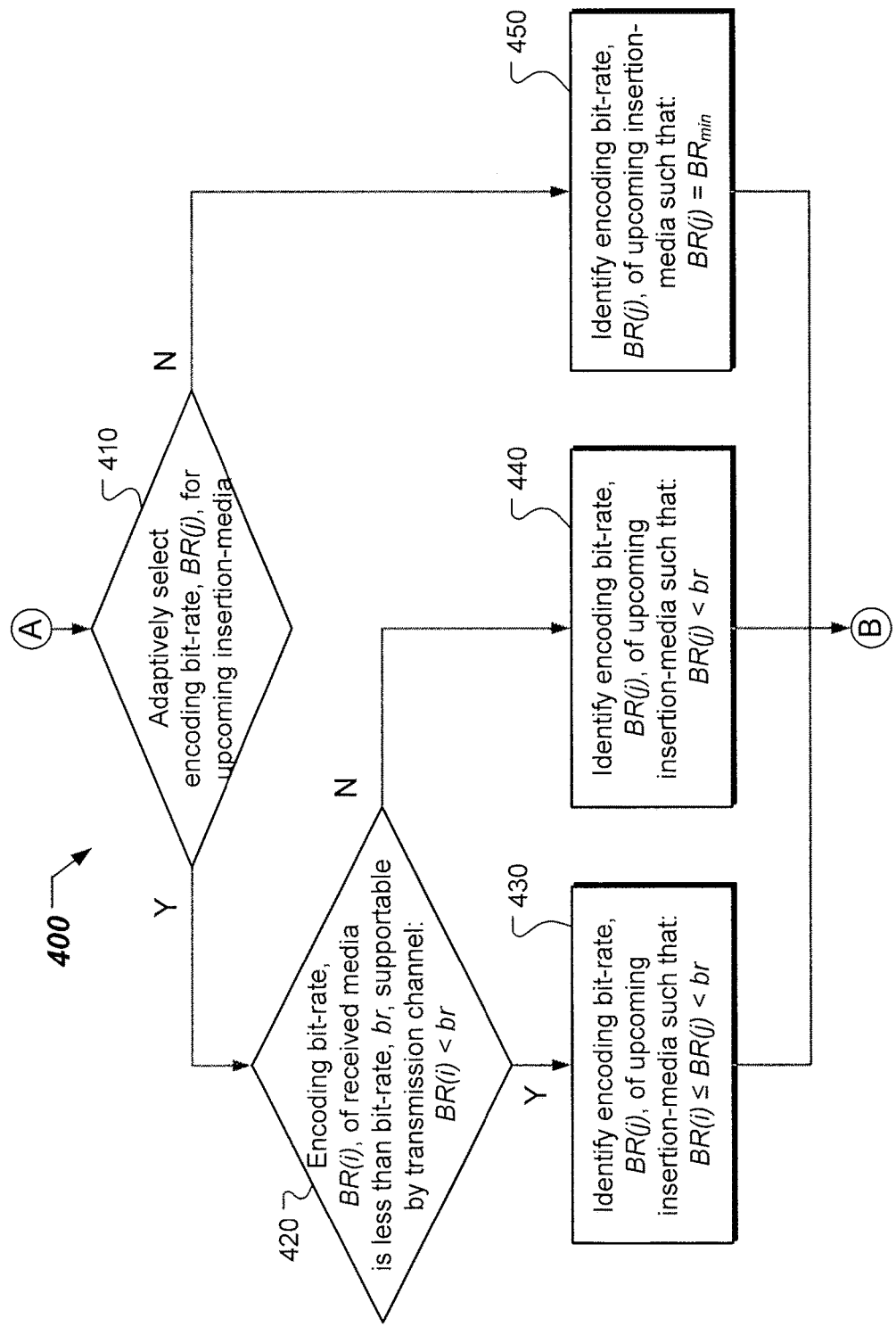
FIG. 4 shows a flow diagram of an example process for selecting an encoding multi-bit-rate for upcoming insertion-media.

FIG. 4 shows a flow diagram of an example process 400 for selecting an encoding bit-rate for upcoming insertion-media to be played following the received media. The indices "i" and "j" correspond to the received media and the upcoming insertion-media, respectively. In some implementations, the process 400 can be implemented as part of technique 200 (described with reference to FIG. 2), for example, to perform the selection 230 of the encoding bit-rate for the upcoming insertion-media.

The process can adaptively select 410 an encoding bit-rate, BR(j), of an upcoming insertion-media to be played following the received media. Alternatively, the selection 410 of the encoding bit-rate, BR(j), of the upcoming insertion-media can be performed in a non-adaptive (predetermined) manner.

If the selection 410 of the encoding bit-rate, BR(j), of the upcoming insertion-media is to be performed adaptively, then the process can compare 420 an encoding bit-rate, BR(i), of the received media with a supportable streaming bit-rate, br, via the communication channel 30. This comparison 420 may occur during progressive (forward) media playing on the output device at the client 10.

If the encoding bit-rate, BR(i), of the media being output for playing on the output device is less than the supportable streaming bit-rate, br, via the communication channel 30, then the process identifies 430 the encoding bit-rate, BR(j), of the upcoming insertion-media to be larger than or equal to the encoding bit-rate, BR(i), of the media being output for playing on the output device, and smaller than the supportable streaming bit-rate, br, via the communication channel 30.

If the encoding bit-rate, BR(i), of the media being output for playing on the output device is larger than or equal to the supportable streaming bit-rate, br, via the communication channel 30, then the process identifies 440 the encoding bit-rate, BR(j), of the upcoming insertion-media to be smaller than the supportable streaming bit-rate, br, via the communication channel 30.

If the selection 410 of the encoding bit-rate, BR(j), of the upcoming insertion-media is to be carried out non-adaptively, then the process can identify 450 the encoding bit-rate, BR(j), of the upcoming insertion-media to be the smallest of encoding bit-rates, BR(j)=BRmin. In another implementation, the process can identify 450 the encoding bit-rate, BR(j), of the upcoming insertion-media to be equal to, or smaller than the encoding bit-rate, BR(i), of the media being output for playing on the output device. In yet another implementation, the process can identify 450 a largest available encoding bit-rate, BR(j), of the upcoming insertion-media that is smaller than the encoding bit-rate of the data being output for playing on the output device.

Upon fetching the final segment of the insertion-media, the primary media may be resumed. FIG. 5A shows an example technique 500 for providing a segment of a media document upon ending of an insertion-media. Technique 500 enables a high-quality, seamless transition from the multi-bit-rate insertion-media back to the multi-bit-rate primary media.

The technique can receive 510 insertion-media data regarding an insertion-media document from the insertion-media streaming provider 24 via the communication channel 30. The received insertion-media data regarding the insertion-media document can include an indication for the ending of the insertion-media.

While the received insertion-media data including the ending of the insertion-media is being output for playing 520 on an output device at the consumer 10, the technique can select 530 an encoding bit-rate for a segment of the media document following the insertion-media. For example, the selection 530 may be based on a combination of information—included in the in-memory index—relating to available encoding bit-rates for the segments of the media document and a supportable streaming bit-rate via the communication channel 30. For example, upon receiving 510 the last insertion-media data regarding the insertion-media document, the processor at the client 10 can infer (from TCP information) an instant streaming bit-rate supportable via the communication channel 30. Once the processor at the client 10 infers the instant streaming bit-rate supportable via the communication channel 30, the selection 530 can proceed to identify an encoding bit-rate that can provide uninterrupted transmission and high resolution play for the segment of the media document following the insertion-media. An example implementation of the selection 530 is described in detail with reference to FIG. 5B.

The technique can then request 540 from the media streaming provider 20 the segment of the media document following the insertion-media at the selected encoding bit-rate.

Figure 5B:
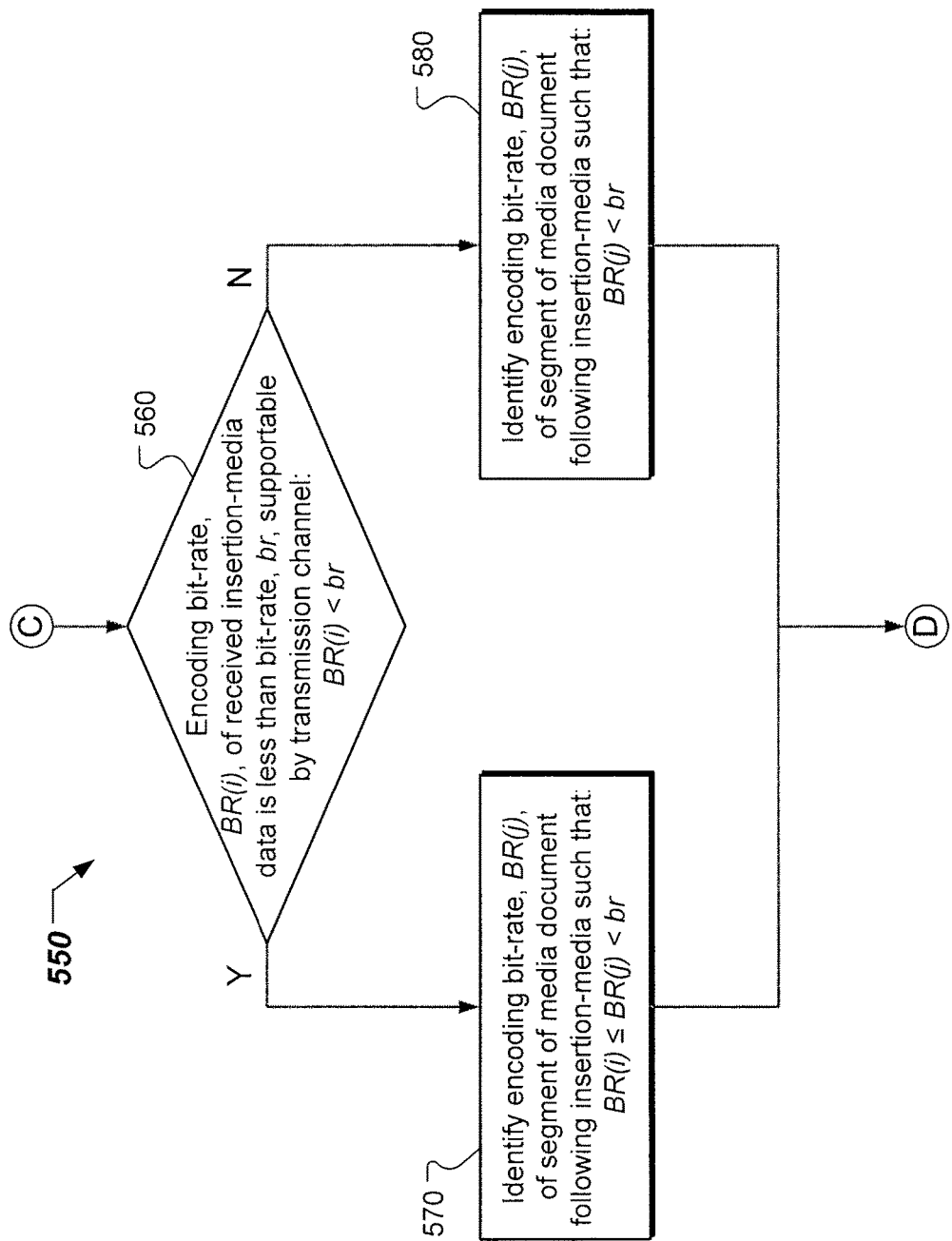
FIG. 5B shows a flow diagram of an example process for selecting an encoding multi-bit-rate for a segment of a media document that follows insertion-media.

A client may adaptively select the encoding bit-rate of the primary media to enable a high-quality, seamless transition from the multi-bit-rate insertion-media back to the multi-bit-rate primary media. FIG. 5B shows a flow diagram of an example process 550 for selecting an encoding bit-rate for a segment of a media document that follows insertion-media. The indices "i" and "j" correspond to the received insertion-media and the selected media, respectively. The process 550 can be implemented as part of technique 500 (described with reference to FIG. 5A), for example, for adaptively performing the selection 530 of the encoding bit-rate of a segment of the media document following the insertion-media.

The process can compare 560 an encoding bit-rate, BR(i), of the received insertion-media with a supportable streaming bit-rate, br, via the communication channel 30. This comparison 560 may occur during progressive (forward) playing of the insertion-media on the output device at the client 10.

If the encoding bit-rate, BR(i), of the insertion-media being output for playing on the output device is less than the supportable streaming bit-rate, br, via the communication channel 30, then the process identifies 570 the encoding bit-rate, BR(j), of the segment of the media document following the insertion-media to be larger than or equal to the encoding bit-rate, BR(i), of the insertion-media being output for playing on the output device, and smaller than the supportable streaming bit-rate, br, via the communication channel 30.

If the encoding bit-rate, BR(i), of the insertion-media being output for playing on the output device is larger than or equal to the supportable streaming bit-rate, br, via the communication channel 30, then the process identifies 580 the encoding bit-rate, BR(j), of the segment of the media document following the insertion-media to be smaller than the supportable streaming bit-rate, br, via the communication channel 30.

In other implementations, the process can identify the encoding bit-rate, BR(j), of the segment of the media document following the insertion-media to be smaller than the encoding bit-rate, BR(i), of the insertion-media being output for playing on the output device, even if the encoding bit-rate, BR(i), of the insertion-media being output for playing on the output device is less than the supportable streaming bit-rate, br, via the communication channel 30. The foregoing selection may occur if the processing capacity of the client processor becomes insufficient to decode media encoded at the bit-rate, BR(i), of the insertion-media being output for playing on the output device.

Returning to FIG. 5A, if the selection 530 of the encoding bit-rate, BR(j), of the segment of the media document following the insertion-media is to be carried out non-adaptively, then the encoding bit-rate, BR(j), of the segment of the media document can be an encoding bit-rate, BR(i), of the insertion-media data being output for playing on the output device. In another non-adaptive implementation of the selection 530, the client 10 may select the lower (or an average) of the encoding bit-rate, BR(i), of the insertion-media data being output for playing and an encoding bit-rate, BR(last), of the media data output for playing prior to the insertion of the currently playing insertion-media.

The systems and techniques described in this specification can also be implemented for inserting a secondary media stream (referred to as insertion-media) into a primary media stream in cases for which indexing of media documents and insertion-media documents is implemented differently from the indexing presented with reference to FIGS. 3B and 3C, respectively.

Figure 6:
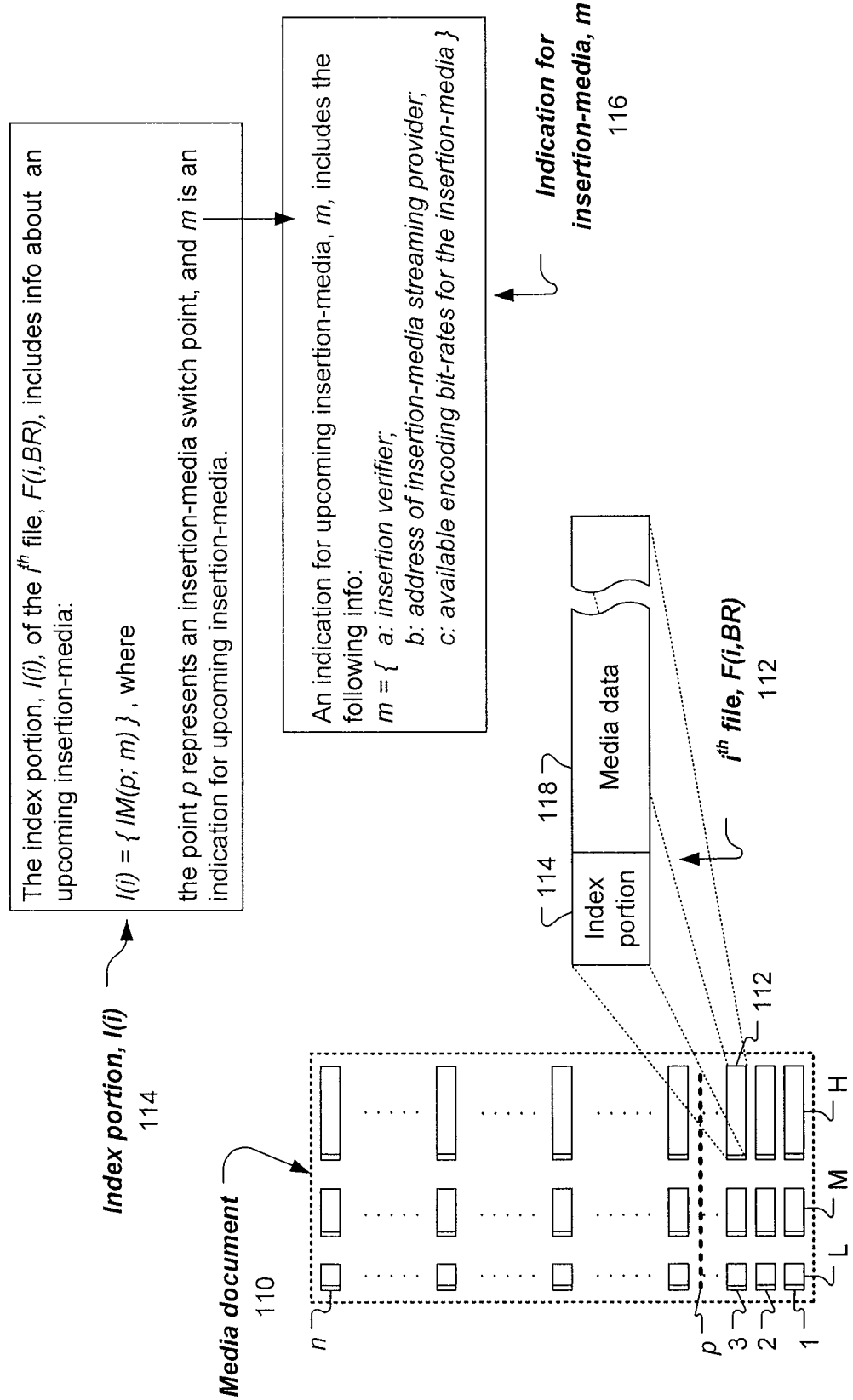
FIG. 6 shows a schematic of an example media document including an index stored outside the media document.

FIG. 6 shows a schematic of an example media document 110 including media files 112 corresponding to portions of media included in the media document 110. In some implementations, a media streaming server (like the example media streaming server 22 illustrated in FIG. 3A) can include a storage device configured to store the media document 110 containing media files 112. Each media file 112 can correspond to a portion of media 118 included in the media document 110. Further, each media file 112 can include an index portion, I(i) 114, that can contain information about an upcoming insertion-media, IM(p,m), including an indication for insertion-media, m 116, corresponding to scheduled insertion-media switch points, "p", in media.

The information included in the indication for the upcoming insertion-media, m 116, can be an insertion verifier, "a"; a reference to the location of the upcoming insertion-media, "b", at the insertion-media streaming provider 24; and available encoding bit-rates for the other upcoming insertion-media, "c". The elements "a", "b" and "c" of the indication for the upcoming insertion-media, m 116, have been discussed in detail with respect to FIG. 3B.

The media streaming server 22 at the media streaming provider 20 can receive, from the client 10, a request for at least a portion of the media 118 included in the media document 110. The media streaming server 22 can provide to the client 10 the requested portion of the media 118 and the associated index portion 114 including an indication for the upcoming insertion-media, m 116. Subsequently, the client 10 may perform the techniques 200 and 500 in the manner described with reference to FIGS. 2 and 5A, respectively, based at least in part on the information included in the received index portion 114.

Figure 7:
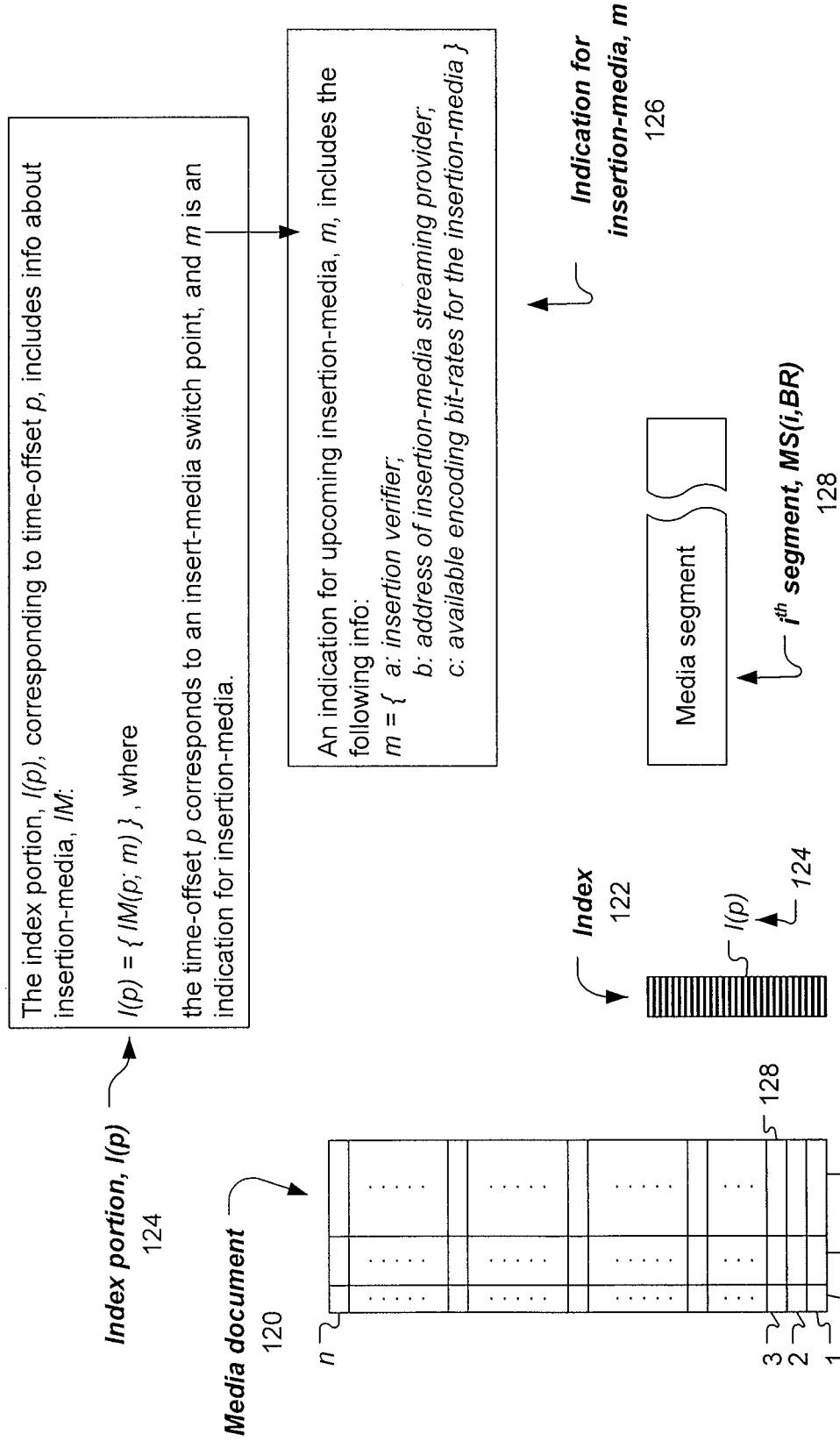
FIG. 7 shows a schematic of an example media document including media files corresponding to portions of media included in the media document.

FIG. 7 shows a schematic of an example media document 120 including an index 122 stored outside the media document 120. In some implementations, a media streaming server (like the example media streaming server 22 illustrated in FIG. 3A) can include a storage device configured to store the media document 120 and an index for the media document 122. In this implementation, the index for the media document 122 is encoded separately from the media document 120. The index for the media document 122 can include references to byte-offsets of the media document 120. The byte-offsets can correspond to portions of media 128 included in the media document 120. Further, the portions of the index for the media document 124 can include information about an upcoming insertion-media, IM(p,m), including an indication for insertion-media, m 126, corresponding to scheduled insertion-media switch points, "p", in media.

The information included in an indication for the upcoming insertion-media, m 126, can be an insertion verifier, "a"; a reference to a location of the upcoming insertion-media, "b", at the insertion-media streaming provider 24; and available encoding bit-rates for the other upcoming insertion-media, "c". The elements "a", "b" and "c" of the indication for the upcoming insertion-media, m 126, have been discussed in detail with respect to FIG. 3B.

The media streaming server 22 at the media streaming provider 20 can receive, from the client 10, a request for at least a portion of the media 128 included in the media document 120. If the requested portion of the media 128 corresponds to an upcoming insertion-media switch point, "p", the media streaming server can provide to the client 10 a portion of the index 124 including the indication for the upcoming insertion-media, m 126. Subsequently, the client may perform the techniques 200 and 500 in the manner described with reference to FIGS. 2 and 5A, respectively, based at least in part on the information included in the received index portion 124.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    receiving, at a client computer system from a media provider via a communication channel, a media document comprising a portion of media and a portion of an index for the media document, the portion of the index comprising information relating to fewer than all the segments of the media document and including an insertion-media switch point and an indication for upcoming insertion media, the insertion media being located at an insertion-media provider that is different from the media provider, the indication for the upcoming insertion-media comprising:
        an insertion verifier, the insertion verifier including an instruction to the client computer system to request the insertion media from the insertion-media provider and insert the insertion media if a predetermined condition has been met, and a return reference that includes instructions for returning to playing the media if the condition is not met or after the completion of playing the insertion media;
        an address of the insertion-media provider; and
        available encoding bit-rates for the insertion media;
    determining, by the client computer system, a supportable streaming bit-rate of the communication channel while receiving the portion of media;
    while playing the portion of media on an output device of the client computer system, selecting the insertion media at an encoding bit-rate of the available bit-rates that is less than or equal to the supportable streaming bit-rate of the communication channel;
    requesting a portion of the insertion media from the insertion media provider at the indicated address of the insertion-media provider;
    receiving, by the client computer system, an insertion-media document comprising the portion of the insertion media at the selected bit rate and an insertion-media index, the insertion-media index including an indication of other upcoming insertion media, the indication of the other upcoming insertion media comprising another insertion verifier that indicates whether the client computer system is instructed to request the other insertion media from the insertion-media provider or another insertion-media provider; and
    upon determining that the predetermined condition of the insertion verifier has been met, inserting and playing the insertion media and the other insertion media at the insertion point and on the output device.

2. The method of claim 1, wherein selecting the insertion media further comprises:
    selecting the largest available bit-rate from among the multiple bit-rates that is smaller than the bit-rate of the portion of media playing on the output device.

3. The method of claim 1, wherein selecting the insertion media further comprises:
  selecting the smallest available bit-rate from among the multiple bit-rates.

4. The method of claim 1, wherein requesting the other insertion media further comprises:
  receiving the other insertion media from the insertion media provider or the other insertion-media provider at a bit-rate less than or equal to the supportable streaming bit-rate of the communication channel.

5. The method of claim 1, wherein the insertion media is an advertisement.

6. The method of claim 1, further comprising receiving the portion of media and the insertion media into a buffer of the client computer system to avoid breaks in the output on the output device.

7. The method of claim 1, the insertion media further comprising several individual insertion media files played together and sequentially at the insertion point on the output device.

8. The method of claim 1, further comprising:
  while receiving the insertion-media document, determining, by the client computer system, another supportable streaming bit-rate of the communication channel;
  selecting an encoding bit-rate for a segment of the media document that follows the insertion-media based on the other supportable streaming bit-rate; and
  request the segment of the media document at the selected encoding bit-rate.

9. The method of claim 8, wherein the request for the segment includes a byte-offset to indicate the beginning of the segment and a byte-range indicating the size of the segment.

10. The method of claim 1, wherein a communication protocol over the communication channel is Transmission Control Protocol (TCP) and the determining the supportable bit-rate of the communication channel comprises inferring an instant streaming bit-rate from TCP information.

11. The method of claim 1, wherein the insertion-media index includes an indication of an end of the insertion media and the method further comprising using the return reference to return to playing the media at the indicated end of the insertion media.

12. The method of claim 1, wherein the address of the insertion-media provider is a reference to a redirection service that provides insertion media on a rotating basis.

13. A non-transitory computer-readable medium encoding instructions that, when executed by a programmable processor of a client computer system, cause the programmable processor to configure the client computer system to:
  receive, from a media provider via a communication channel, a media document comprising a portion of media and a portion of an index for the media document, the portion of the index comprising information relating to fewer than all the segments of the media document and including an insertion-media switch point and an indication for upcoming insertion media, the insertion media being located at an insertion-media provider that is different from the media provider, the indication for the upcoming insertion-media comprising:
    an insertion verifier, the insertion verifier including an instruction to the client computer system to request the insertion media from the insertion-media provider and insert the insertion media if a predetermined condition has been met, and a return reference that includes instructions for returning to playing the media if the condition is not met or after the completion of playing the insertion media;
    an address of the insertion-media provider; and
    available encoding bit-rates for the insertion media;
  determine a supportable streaming bit-rate of the communication channel while receiving the portion of media;
  while playing the portion of media on an output device of the client computer system, select the insertion media at an encoding bit-rate of the available bit-rates that is less than or equal to the supportable streaming bit-rate of the communication channel;
  request a portion of the insertion media from the insertion media provider at the indicated address of the insertion-media provider;
  receive an insertion-media document comprising the portion of the insertion media at the selected bit rate and an insertion-media index, the insertion-media index including an indication of other upcoming insertion media, the indication of the other upcoming insertion media comprising another insertion verifier that indicates whether the client computer system is instructed to request the other insertion media from the insertion-media provider or another insertion-media provider; and
  upon determining that the predetermined condition of the insertion verifier has been met, insert and play the insertion media and the other insertion media at the insertion point and on the output device.

14. The non-transitory computer-readable medium of claim 11, wherein the selection of the bit-rate for the insertion media configures the client computer system to:
  select the largest bit-rate for the insertion media that is smaller than the bit-rate of the portion of media playing on the output device.

15. The non-transitory computer-readable medium of claim 13, wherein the insertion-media index includes an indication for an ending of the insertion media and wherein the operations further configure the client computer system to use the return reference to return to playing the media at the indicated end of the insertion media.

16. The non-transitory computer-readable medium of claim 15, wherein the operations further configure the client computer system to:
  while receiving the insertion-media document, determine another supportable streaming bit-rate of the communication channel;
  selecting an encoding bit-rate for a segment of the media document that follows the insertion-media, based on the other supportable streaming bit-rate; and
  request the segment of the media document at the selected encoding bit-rate.

17. A system comprising:
  a server for providing media streaming, the server configured to:
    receive a request from a user device via a data communication network for a media document comprising a portion of media and a portion of an index for the media document, including an interleaved index;
    distribute, to the user device, the media document, the portion of the index comprising information relating to fewer than all the segments of the media document and including an insertion-media switch point configured to cause the user device to insert and play insertion media at the scheduled insertion-media switch point, and an indication for upcoming insertion media, the insertion media being located at an insertion-media provider that is different from the server, the indication for the upcoming insertion-media comprising:
an address of the insertion-media streaming provider;
available encoding bit-rates for the upcoming insertion-media; and
an insertion verifier, the insertion verifier including an instruction to the user device to request the insertion media from the insertion-media provider and insert the insertion media if a predetermined condition has been met, and a return reference that is effective to cause the user device to return to outputting the portion of media distributed to the user device if the condition is not met or after the completion of playing the insertion media, the instruction being configured to cause the user device to request the selected insertion media at a bit-rate rate that is less than or equal to a supportable streaming bit-rate of the data communication network that is determined at the user device, and using the address of the insertion-media streaming provider.

18. The system of claim 17, wherein the server for providing media streaming comprises:
a storage device configured to store the media and the index, wherein the index for the media is encoded within the media; and
a processor communicatively coupled to the storage device, the processor configured to:
receive, from the user device, a request for the portion of media; and
distribute provide, to the user device, the requested portion of media.

19. The system of claim 17, wherein the index comprises multiple insertion points corresponding to multiple insertion media scheduled for insertion in the portion of media.

20. The system of claim 17, wherein the server for providing media streaming comprises:
a storage device configured to store the media in media files corresponding to the portions of media at multiple different bit-rates.

* * * * *

UNITED STATES PATENT AND TRADEMARK OFFICE
CERTIFICATE OF CORRECTION

PATENT NO.        : 9,680,892 B2
APPLICATION NO.   : 12/493126
DATED             : June 13, 2017
INVENTOR(S)       : Matthew Kaufman Page 1 of 1

It is certified that error appears in the above-identified patent and that said Letters Patent is hereby corrected as shown below:

In the Claims

Column 22, Line 31, after "claim", delete "11", insert -- 13 --, therefor.

Signed and Sealed this
Fifteenth Day of August, 2017

Joseph Matal
*Performing the Functions and Duties of the
Under Secretary of Commerce for Intellectual Property and
Director of the United States Patent and Trademark Office*